(No Model.)
H. T. BRIGGS.
SPLIT PULLEY.
No. 432,857.  Patented July 22, 1890.
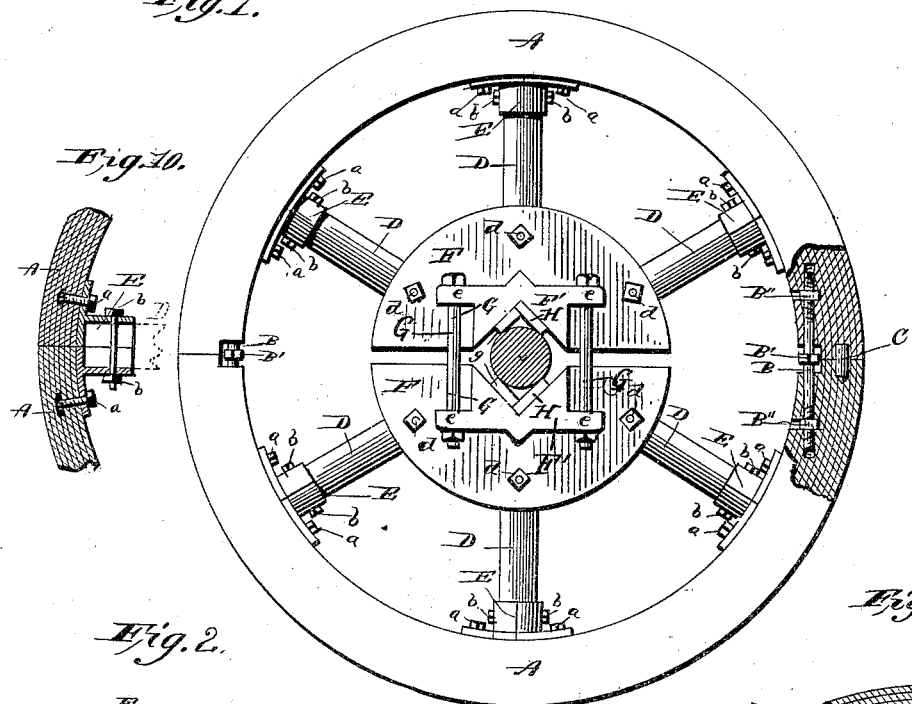
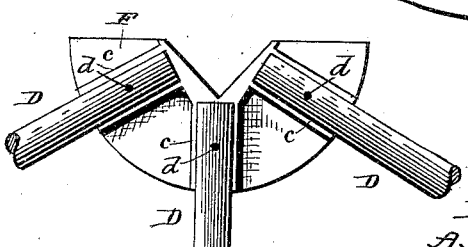
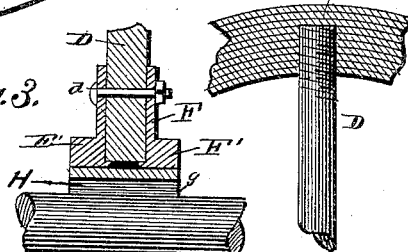
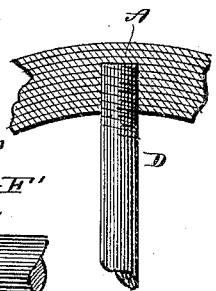
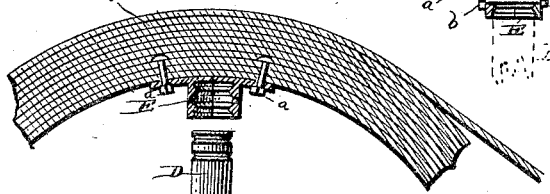
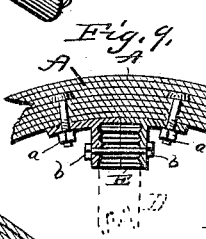
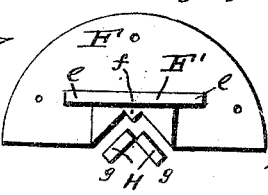
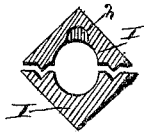
WITNESSES
INVENTOR
H. T. Briggs
By C. M. Alexander
Attorney

UNITED STATES PATENT OFFICE.

HARRISON T. BRIGGS, OF SOUTH BEND, INDIANA, ASSIGNOR OF THREE-FOURTHS TO ALBERT MYERS AND J. BENJAMIN BIRDSELL, OF SAME PLACE, AND WILLIAM T. CARSKADDON, OF LOS ANGELES, CALIFORNIA.

SPLIT PULLEY.

SPECIFICATION forming part of Letters Patent No. 432,857, dated July 22, 1890.

Application filed May 23, 1888. Serial No. 274,788. (No model.)

*To all whom it may concern:*

Be it known that I, HARRISON T. BRIGGS, a citizen of the United States, residing at South Bend, in the county of St. Joseph and State of Indiana, have invented certain new and useful Improvements in Split Pulleys, of which the following is a specification, reference being had therein to the accompanying drawings.

My invention has relation to certain new and useful improvements upon "split pulleys;" and it has for its objects, essentially, to provide a pulley that will be light, strong, and easily assembled and firmly clamped upon any portion of a shaft, as will be more fully hereinafter set forth.

The invention consists in certain novel features of construction and arrangements of parts, that will be fully hereinafter specified, and particularly pointed out in the claims appended.

The above objects I accomplish by the means illustrated in the accompanying drawings, in which—

Figure 1 represents a side elevation of my improved pulley complete, a portion of the adjacent ends of the rim being broken away to show the method of joining the same; Fig. 2, a detail view showing the method of attaching arms of pulley to hub-sections; Fig. 3, a detail sectional view of the hub and bushings; Fig. 4, a detail view of a portion of the rim, showing manner of attaching outer ends of arms to same, the arm being withdrawn from its socket; Fig. 5, a detail view of the bushing employed to grip the shaft; Fig. 6, a detail view of bushing employed with a loose pulley; Fig. 7, a detail view of one of the hub-sections; Fig. 8, a sectional view of a portion of the rim, showing a modified form of attaching arms thereto; Fig. 9, a similar view to Fig. 4, showing the arm inserted in its socket; and Fig. 10, a detail view showing the method of employing the divided arm-sockets to assist in securing the sections of pulley-rim together.

In the drawings, the letters A A designate the semicircular sections of the rim, which are preferably constructed of a suitable number of layers of veneering glued or otherwise secured together. The adjacent ends of these rim-sections are connected together by means of double ended or joint bolts B and dowel-pins C. The joint-bolts are each provided with oppositely-pitched screw-threads at their ends and a squared portion or boss B' midway their length, the inner edges of the adjoining ends of the rim being recessed or notched for the reception of this boss B', permitting the application of a wrench to it to turn it. The screw-threaded ends of these bolts B work in internally-screw-threaded nuts B'', inserted in recesses formed in the inner face of the rim. By turning the joint-bolts by means of a wrench it will be observed that the sections of the rim may be drawn tightly and firmly together, the dowel-pins serving to hold the sections true and even at all times.

The outer ends of the arms or spokes D are attached to the rims by means of flanged separable sockets E, which are bolted to the inner face of the rim by bolts a, these bolts extending through perforations in the flanges of the sockets and having their heads embedded in the rim, as shown in Figs. 4 and 9. These bolts are embedded in the rim as the same is being built up of the veneer layers, the screw-threaded ends of the bolts being left projecting from the inner face of the rim. The sockets are each preferably constructed of two sections, which are secured together by means of a transverse bolt b, this bolt passing through the tubular portion of the socket and transversely through the arm, thereby serving to hold the same in its socket. The socket is provided on its interior surface with flanges or teeth, which enter the arm and assist in preventing its premature or accidental withdrawal.

The hub of the pulley is constructed of four semi-cylindrical plates or sections F, two of which are placed on each side of the pulley. The inner or contiguous faces of these plates F are provided with semi-tubular sockets c, which closely embrace and clamp the inner ends of the arms D, bolts d being employed to draw the plates together, these bolts preferably passing transversely through the arms, as shown.

The sections F each have formed integral with them an enlargement F′, which project a short distance from the outer faces of the sections and are provided with perforated ears e. Through the perforated ears e pass the long bolts G for clamping the pulley upon the shaft, the sections F and enlargements F′ being provided with V-shaped notches for the passage of the shaft. Clamped between the hub-sections and the shaft are the hard-metal bushing-plates H, the edges g of which bite into the shaft when the bolts G are tightened, the grip on the shaft by these plates being similar to the grip of pipe-tongs, which, as is well known, is very firm and secure. These bushing-plates may be cast integral, as shown at the left of Fig. 5, or they may be made separate, as shown in the other figures. As shown at the right of Fig. 5, the abutting ends are beveled, and, as shown in Fig. 7, they are adapted to abut against angular projections f on the enlargements F′ on plate F. Any one of these forms of bushing can be used, as may be desired.

In lieu of attaching the arms to the rim by means of the sockets E, I may screw them into the wooden rim, as shown in Fig. 8.

In Fig. 6 I show the form of bushing I desire to use when the pulley is to be used as a loose pulley. In this instance I employ two blocks I I, which are adapted to loosely embrace the shaft, one of the blocks being provided with a recess h for retaining a lubricant.

As shown in Fig. 10, I may employ the divided sockets E to assist in securing the sections A A of the rim together. In this case one-half of the socket will be bolted to the adjacent ends of the rim, as shown, the connecting-bolt b serving to draw the parts together.

Having thus fully described my invention, what I claim as new, and desire to secure by Letters Patent, is—

1. In a pulley, the herein-described hub, composed of four sections, each having a shaft-embracing portion provided with perforated ears and a semi-cylindrical flange having channels on its inner face for the reception of the ends of the spokes, and the uniting-bolts for said sections, substantially as specified.

2. In a wood-rim split pulley, a hub composed of four similar sections, each having a projecting shaft-embracing portion provided with bolt-openings and a flange channeled on its inner face to form seats for the spokes, the uniting-bolts for said sections, and the rim and spokes, substantially as specified.

3. In a pulley, the combination of the rim and spokes with the hub composed of four similar sections having semicircular flanges channeled on their inner faces, substantially as described, to form spoke-seats and bolted to the spokes and to each other, and a shaft-embracing portion on the outer faces of said flanges, as and for the purpose set forth.

4. In a split pulley, a hub composed of four similar sections, each having a projecting shaft-embracing portion provided with bolt-openings and a flange channeled on its inner face to form seats for the spokes, and the uniting-bolts for said sections, in combination with the rim-sections and the spokes clamped to the hub and united to the rim by a threaded connection, substantially as specified.

5. The hub consisting of four semicircular plates F, each provided with semi-tubular sockets c on their contiguous faces and enlargements F′ on their outer faces, having perforated ears e, the bolts G, passed through the said perforated ears e and adapted to clamp the pulley upon a shaft, spokes having their inner ends inserted in the said sockets c, and a sectional rim attached to the outer ends of the spokes, substantially as specified.

6. The combination of the rim-sections A A, the joint-bolts B, provided with bosses B′ midway their length, the ends of these bolts being screw-threaded in opposite directions and inserted in recesses in the adjacent ends of the rim-sections, nuts B″, tapped on the ends of the said bolts and inserted in recesses in the rim-sections, separable sockets bolted to the rim-sections, arms D, secured in the said sockets, the hub-sections F, each provided with semi-tubular sections for the reception and retention of the inner ends of the said arms D, and provided with projections F′ on the said hub-sections, and the latter having perforated ears e, the connecting-bolts d G, and removable bushings, all arranged substantially as herein shown and described.

7. The combination of a sectional hub, radial arms attached to the hub, a sectional rim attached to outer ends of arms, the said hub-sections being provided with V-shaped notches for the passage of the shaft, hard-metal bushing-plates H, inserted in the said V-shaped notches, the edges g of these plates being adapted to bite into and firmly grip the shaft, and bolts G for clamping the pulley to a shaft, substantially as described.

8. The combination of the hub, consisting of the four semicircular plates F, each provided with semi-tubular sockets c on their contiguous faces and enlargements F′ and perforated ears e on their outer faces, bolts G, passed through the said perforated ears e and adapted to clamp the pulley upon the shaft, arms D, having their inner ends inserted in the said sockets c and held therein by bolts d, and a sectional rim attached to outer end of arms D, substantially as described.

9. The combination of a sectional hub, bolts G for drawing the sections together, arms connected to the hub at their inner ends, a sectional rim composed of layers of veneer, tubular sockets E for attaching arms to rim, the said sockets constructed of two sections and bolted together by means of transverse bolts $b$, and bolts $a$ for attaching sockets to inner surface of rim, the heads of the said bolts $a$ being embedded in the veneer rim, substantially as described.

In testimony whereof I affix my signature in presence of two witnesses.

HARRISON T. BRIGGS.

Witnesses:
A. S. DUNBAR,
S. C. ULERY.